United States Patent
Hsieh

(10) Patent No.: US 7,800,605 B2
(45) Date of Patent: Sep. 21, 2010

(54) MULTI-VIEW VIDEO SWITCHING CONTROL METHODS AND SYSTEMS

(75) Inventor: Ping-Huei Hsieh, Taipei (TW)

(73) Assignee: Via Technologies Inc., Taipei (TW)

(\*) Notice: Subject to any disclaimer, the term of this patent is extended or adjusted under 35 U.S.C. 154(b) by 1134 days.

(21) Appl. No.: 11/197,974

(22) Filed: Aug. 5, 2005

(65) Prior Publication Data

US 2006/0214950 A1 Sep. 28, 2006

(30) Foreign Application Priority Data

Mar. 24, 2005 (TW) .............................. 94109086 A

(51) Int. Cl.
*G06F 3/038* (2006.01)
*G09G 5/00* (2006.01)

(52) U.S. Cl. .................. 345/214; 345/215; 345/501; 345/531; 345/532

(58) Field of Classification Search ........... 345/3.1–3.4, 345/501, 634, 214–215
See application file for complete search history.

(56) References Cited

U.S. PATENT DOCUMENTS

| | | | | |
|---|---|---|---|---|
| 5,764,201 A * | 6/1998 | Ranganathan | ................ | 345/3.3 |
| 5,969,769 A * | 10/1999 | Hamadate | .................... | 348/568 |
| 6,011,594 A * | 1/2000 | Takashima | .................... | 348/565 |
| 6,249,322 B1 * | 6/2001 | Sugihara | ..................... | 348/634 |
| 6,295,360 B1 * | 9/2001 | Ryan et al. | ..................... | 380/54 |
| 6,404,889 B1 * | 6/2002 | Ryan et al. | .................. | 380/201 |
| 6,483,987 B1 * | 11/2002 | Goldschmidt Iki et al. | .... | 386/83 |
| 6,490,001 B1 * | 12/2002 | Shintani et al. | ............. | 348/554 |
| 6,522,309 B1 * | 2/2003 | Weber | ......................... | 345/1.1 |
| 6,590,618 B1 * | 7/2003 | Park et al. | ................... | 348/734 |
| 6,710,816 B1 * | 3/2004 | Minami | ....................... | 348/554 |
| 6,848,792 B1 * | 2/2005 | De Meerleer | ................ | 353/30 |
| 6,980,257 B2 * | 12/2005 | Fairhurst et al. | ............ | 348/589 |
| 2004/0196280 A1 * | 10/2004 | Yee | ............................. | 345/418 |
| 2006/0181480 A1 * | 8/2006 | Yee | ............................. | 345/3.1 |
| 2006/0204219 A1 * | 9/2006 | Kamio | ........................ | 386/95 |
| 2007/0005334 A1 * | 1/2007 | Salmonsen | ................... | 703/26 |

FOREIGN PATENT DOCUMENTS

CN 1205151 1/1999

\* cited by examiner

*Primary Examiner*—Xiao M Wu
*Assistant Examiner*—Abderrahim Merouan
(74) *Attorney, Agent, or Firm*—Thomas, Kayden, Horstemeyer & Risley

(57) ABSTRACT

Multi-view video switching control methods and systems are disclosed. It is determined whether a VBI (vertical blanking interval) of signals respectively transmitted by a first GA (graphic array) and a second GA is detected. The video source of first and second GAs belongs to the same first video source. If the VBI corresponding to first GA is detected first, the video source of first GA is switched to a second video source, and the video source of second GA is switched to the second video source if the VBI corresponding to second GA is then present. If the VBI corresponding to second GA is detected first, the video source of second GA is switched to the second video source, and the video source of first GA is switched to the second video source if the VBI corresponding to first GA is then present.

6 Claims, 3 Drawing Sheets

MULTI-VIEW VIDEO SWITCHING CONTROL METHODS AND SYSTEMS

BACKGROUND

The present disclosure relates generally to video display, and, more particularly to control methods and systems that efficiently switch displays in a multi-view environment.

With the advance of information technology, computer systems provide multiple screen display functions, such as a DuoView technique. In DuoView, a computer system uses two graphic arrays (GAs), such as integrated graphic arrays (IGAs) to fetch and play back a single video source in different timing.

Additionally, in image rendering, a Flip (video switching) technique is used to enhance the rendering speed, and avoid display of rendering procedure. In Flip, an image is pre-rendered and stored in a specific rendering buffer, and after the image has been rendered, a rendering buffer originally accessed by a graphic array is switched to the specific rendering buffer comprising the new rendered image during an information notification interval, such as a vertical blanking interval (VBI) of message transmission.

In the DuoView environment, the conventional Flip technique must detect the vertical blanking interval of signals transmitted by a specific graphic array, and switch the video source in the interval. After the video source of the specific graphic array is switched, the vertical blanking interval of signals transmitted by another graphic array is then detected, and the video source is switched in the interval. FIG. 1 is a timing diagram illustrating an example of multi-view video switching control. As shown in FIG. 1, it is assumed a direction of video switching is received at T1. In this example, after the vertical blanking interval of signals transmitted by GA1 is detected at T2, the video source of GA1 is switched in the interval. Thereafter, at T3, the video source of GA2 is switched if the vertical blanking interval of signals transmitted by GA2 is detected. Conventionally, since a specific graphic array must be specified, the video switching can take a maximum of an additional whole cycle to complete.

SUMMARY

Multi-view video switching control methods and systems are provided.

In an exemplary embodiment of a multi-view video switching control method, it is determined whether a vertical blanking interval of signals respectively transmitted by a first graphic array and a second graphic array is present. The video source of the first and second graphic arrays belongs to the same first video source. If the vertical blanking interval corresponding to the signal transmitted by the first graphic array is detected first, the video source of the first graphic array is switched from the first video source to a second video source, and it is continuously determined whether the vertical blanking interval corresponding to the second graphic array is present. If so, the video source of the second graphic array is switched from the first video source to the second video source. If the vertical blanking interval corresponding to the signal transmitted by the second graphic array is detected first, the video source of the second graphic array is switched from the first video source to the second video source, and it is continuously determined whether the vertical blanking interval corresponding to the signal transmitted by the first graphic array is present. If so, the video source of the first graphic array is switched from the first video source to the second video source.

An exemplary embodiment of a multi-view video switching control system comprises a first graphic array, a second graphic array, and a processing module. The first and second graphic arrays transmit signals from a first video source. The processing module detects a vertical blanking interval of signals respectively transmitted by the first graphic array and the second graphic array. If the vertical blanking interval corresponding to the signal transmitted by the first graphic array is detected first, the processing module switches the video source of the first graphic array from the first video source to a second video source, and continuously detects the vertical blanking interval corresponding to the signal transmitted by the second graphic array. If the vertical blanking interval corresponding to the signal transmitted by the second graphic array is detected, the processing module switches the video source of the second graphic array from the first video source to the second video source. If the vertical blanking interval corresponding to the signal transmitted by the second graphic array is detected first, the processing module switches the video source of the second graphic array from the first video source to the second video source, and continuously detects the vertical blanking interval corresponding to the signal transmitted by the first graphic array. If the vertical blanking interval corresponding to the signal transmitted by the first graphic array is detected, the processing module switches the video source of the first graphic array from the first video source to the second video source.

Multi-view video switching control methods may take the form of program code embodied in a tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein.

DESCRIPTION

Multi-view video switching control methods and systems are provided.

Figure 2:
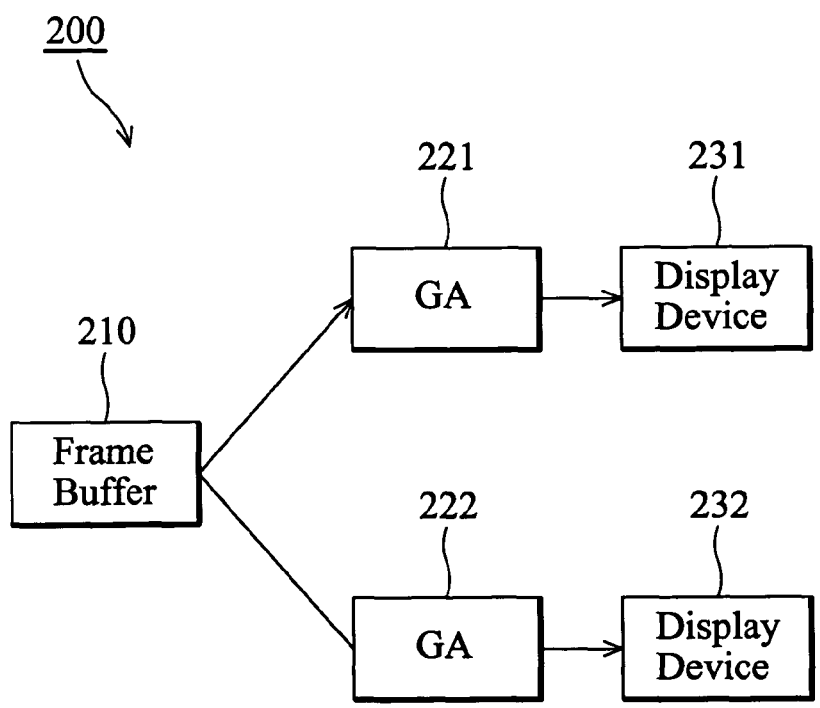
FIG. 2 is a schematic diagram illustrating an embodiment of a multi-view video switching control system.

FIG. 2 is a schematic diagram illustrating an embodiment of a multi-view video switching control system.

The multi-view video switching control system 200 comprises a frame buffer 210, graphic arrays (GAs) 221 and 222, and display devices 231 and 232. It is noted that, while a dual-view environment is disclosed in this embodiment, the invention is equally applicable to any multi-view environment. The graphic arrays 221 and 222 fetch data such as images and videos from a single video source in frame buffer 210, and respectively play back and transmit the data to the display devices 231 and 232 for display with different timing. Additionally, the multi-view video switching control system 200 further comprises a processing module (not shown) comprising hardware or software, receiving directions for video switching generated from an application program (not shown) or a driver (not shown), and performing corresponding operations.

Figure 3:
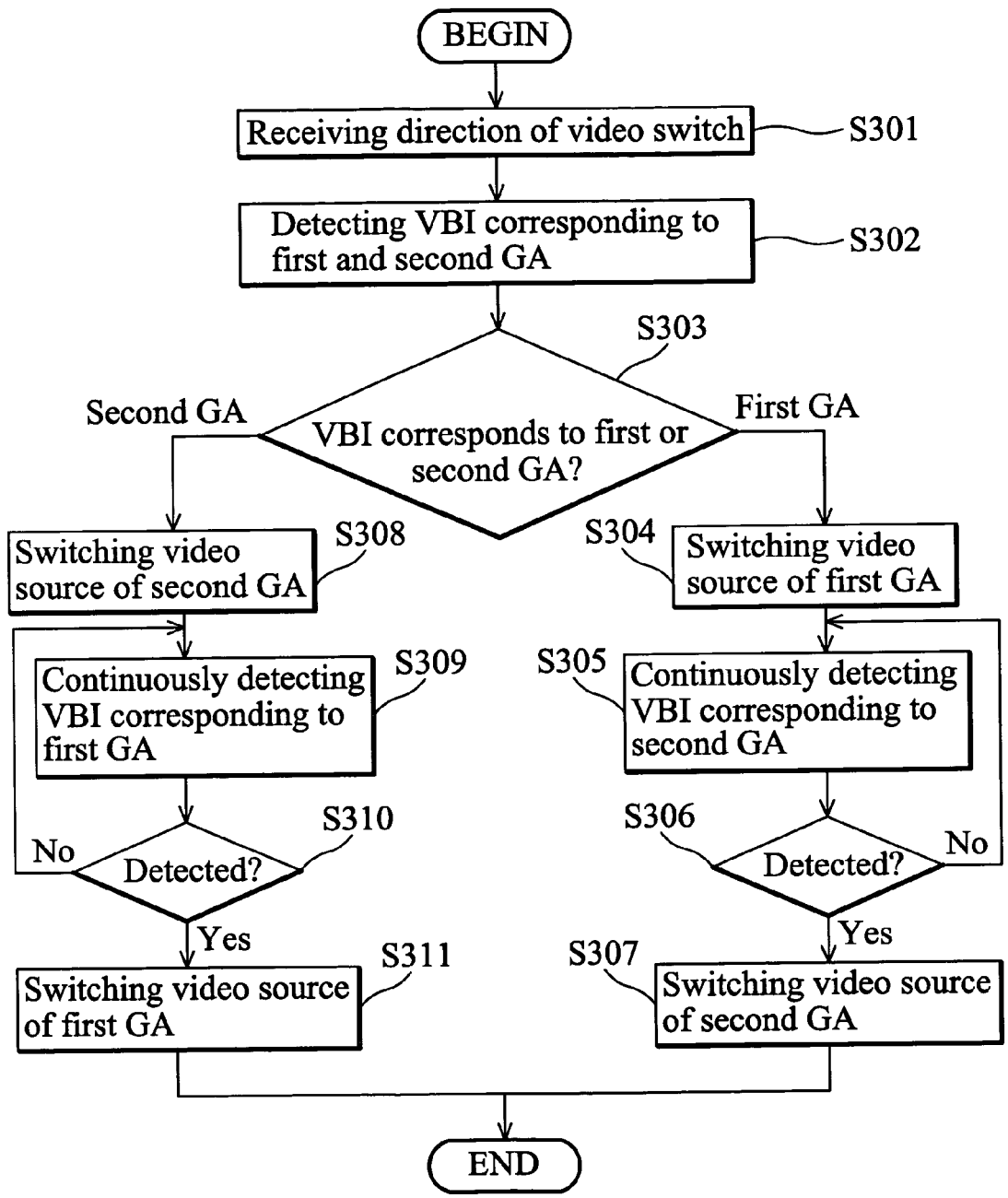
FIG. 3 is a flowchart showing an embodiment of a multi-view video switching control method.

FIG. 3 is a flowchart showing an embodiment of a multi-view video switching control method.

In step S301, a direction for video switching is received. In step S302, the information notification interval, such as the vertical blanking interval of signals respectively transmitted by the first and second graphic arrays, is detected. The video source of the first and second graphic arrays is the same as a first video source.

In step S303, it is determined whether the vertical blanking interval corresponds to the first or second graphic array. If the vertical blanking interval corresponding to the first graphic array is first detected, in step S304, the video source of the first graphic array is switched from the first video source to a second video source. It is understood that switching of video source can be accomplished by assigning different frame buffers or different starting addresses in the frame buffer. In step S305, the vertical blanking interval corresponding to the second graphic array is continuously detected. In step S306, it is determined whether the vertical blanking interval corresponding to the second graphic array has been detected. If not (No in step S306), the procedure remains at step S305. If so (Yes in step S306), in step S307, the video source of the second graphic array is switched from the first video source to the second video source.

If the vertical blanking interval corresponding to the second graphic array is detected first, in step S308, the video source of the second graphic array is switched from the first video source to a second video source, and in step S309, the vertical blanking interval corresponding to the first graphic array is continuously detected. In step S310, it is determined whether the vertical blanking interval corresponding to the first graphic array has been detected. If not (No in step S310), the procedure remains at step S309. If so (Yes in step S310), in step S311, the video source of the first graphic array is switched from the first video source to the second video source.

Figure 1:
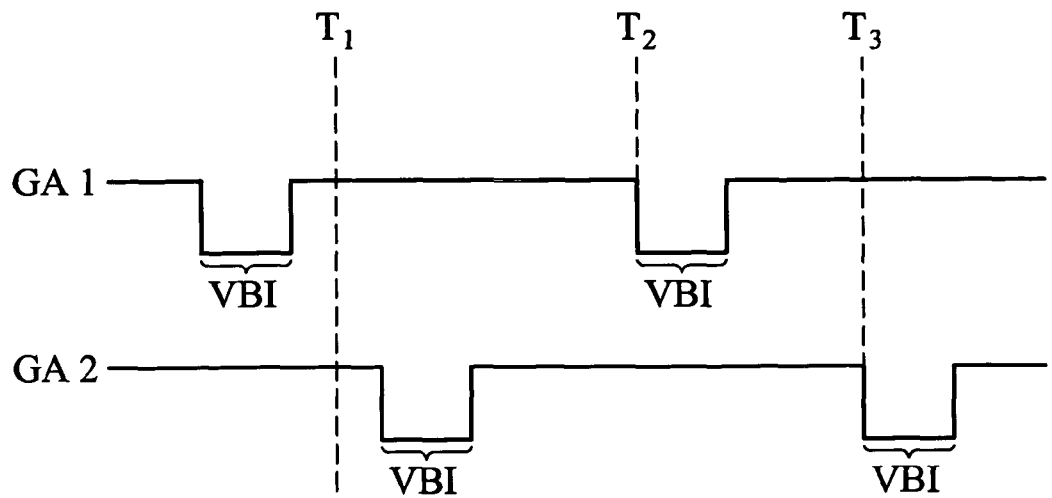
FIG. 1 is a timing diagram illustrating an example of multi-view video switching control.
Figure 4:
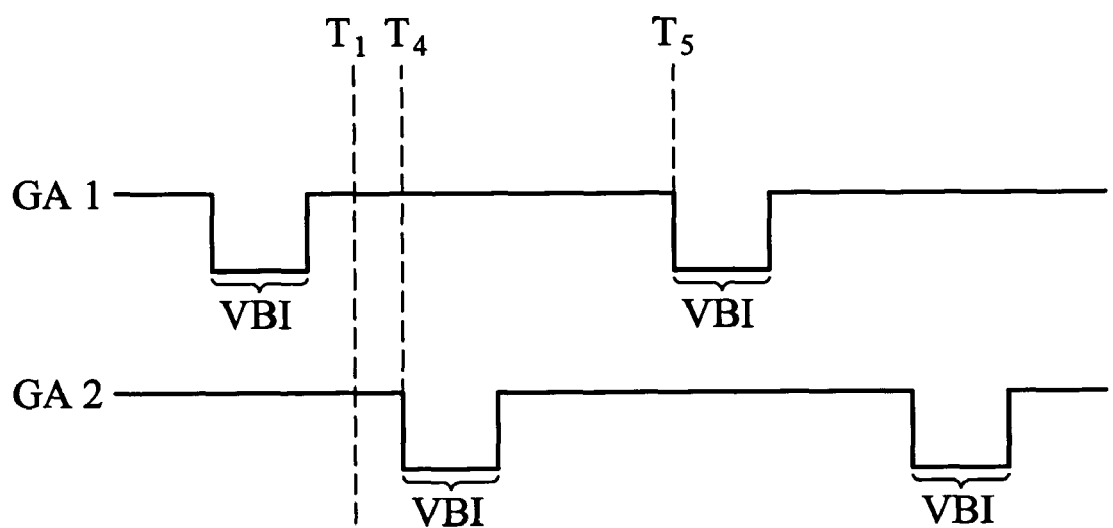
FIG. 4 is a timing diagram illustrating an embodiment of an example of multi-view video switching control.

FIG. 4 is a timing diagram illustrating an embodiment of an example of multi-view video switching control. Compares to FIG. 1, in this embodiment, the vertical blanking interval of signals transmitted by GA2 is first detected at T4, and the video source of GA2 is switched. At T5, the vertical blanking interval of signals transmitted by GA1 is detected, and the video source of GA1 is switched, shortening the time for video switching. The multi-view video switching control methods and systems of the invention thus provide an efficient mechanism for switching displays in the multi-view environment.

Multi-view video switching control methods and systems, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods and apparatus may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in the technology can still make various alterations and modifications without departing from the scope and spirit of this invention. Therefore, the scope of the present invention shall be defined and protected by the following claims and their equivalents.

What is claimed is:

1. A multi-view video switching control method, comprising:

simultaneously detecting an information notification interval of signals respectively transmitted by a first graphic array and a second graphic array to determine whether the information notification interval corresponding to the first graphic array or the information notification interval corresponding to the second graphic array is detected first, in which the video source of the first and second graphic arrays belongs to the same first video source;

if the information notification interval corresponding to the signal transmitted by the first graphic array is detected first, in response to the detected information notification interval corresponding to the first graphic array, automatically switching the video source of the first graphic array from the first video source to a second video source, such that the first graphic array obtains and transmits signals from the second video source, continuously detecting the information notification interval corresponding to the signal transmitted by the second graphic array, and if the information notification interval corresponding to the signal transmitted by the second graphic array is detected, in response to the detected information notification interval corresponding to the second graphic array, automatically switching the video source of the second graphic array from the first video source to the second video source, such that the second graphic array obtains and transmits signals from the second video source; and if the information notification interval corresponding to the signal transmitted by the second graphic array is detected first, in response to the detected information notification interval corresponding to the second graphic array, automatically switching the video source of the second graphic array from the first video source to the second video source, such that the second graphic array obtains and transmits signals from the second video source, continuously detecting the information notification interval corresponding to the signal transmitted by the first graphic array, and if the information notification interval corresponding to the signal transmitted by the first graphic array is detected, in response to the detected information notification interval corresponding to the first graphic array, automatically switching the video source of the first graphic array from the first video source to the second video source, such that the first graphic array obtains and transmits signals from the second video source, wherein the information notification interval comprises a vertical blanking interval.

2. The method of claim 1 further comprising switching the video source from the first video source to the second video source in the vertical blanking interval.

3. A multi-view video switching control system, comprising:
a first graphic array transmitting signals from a first video source; a second graphic array transmitting signals from the first video source; and a processing module simultaneously detecting an information notification interval within signals respectively transmitted by the first graphic array and the second graphic array to determine whether the information notification interval corresponding to the first graphic array or the information notification interval corresponding to the second graphic array is detected first, wherein, if the information notification interval corresponding to the signal transmitted by the first graphic array is detected first, in response to the detected information notification interval corresponding to the first graphic array, the video source of the first graphic array is automatically switched from the first video source to a second video source, such that the first graphic array obtains and transmits signals from the second video source, and the information notification interval corresponding to the signal transmitted by the second graphic array is continuously sought, and, if detected, in response to the detected information notification interval corresponding to the second graphic array, the video source of the second graphic array is automatically switched from the first video source to the second video source, such that the second graphic array obtains and transmits signals from the second video source, and if the information notification interval corresponding to the signal transmitted by the second graphic array is detected first, in response to the detected information notification interval corresponding to the second graphic array, the video source of the second graphic array is automatically switched from the first video source to the second video source, such that the second graphic array obtains and transmits signals from the second video source, and the information notification interval corresponding to the signal transmitted by the first graphic array is continuously sought, and if detected, in response to the detected information notification interval corresponding to the first graphic array, the video source of the first graphic array is automatically switched from the first video source to the second video source, such that the first graphic array obtains and transmits signals from the second video source,
wherein the information notification interval comprises a vertical blanking interval.

4. The system of claim 3 wherein the video source is switched from the first video source to the second video source in the vertical blanking interval.

5. A machine-readable storage medium comprising a computer program, which, when executed, causes a device to perform a multi-view video switching control method, the method comprising:

simultaneously detecting an information notification interval of signals respectively transmitted by a first graphic array and a second graphic array to determine whether the information notification interval corresponding to the first graphic array or the information notification interval corresponding to the second graphic array is detected first, in which the video source of the first and second graphic arrays belongs to the same first video source;

if the information notification interval corresponding to the signal transmitted by the first graphic array is detected first, in response to the detected information notification interval corresponding to the first graphic array, automatically switching the video source of the first graphic array from the first video source to a second video source, such that the first graphic array obtains and transmits signals from the second video source, continuously detecting the information notification interval corresponding to the signal transmitted by the second graphic array, and if the information notification interval corresponding to the signal transmitted by the second graphic array is detected, in response to the detected information notification interval corresponding to the second graphic array, automatically switching the video source of the second graphic array from the first video source to the second video source, such that the second graphic array obtains and transmits signals from the second video source; and if the information notification interval corresponding to the signal transmitted by the second graphic array is detected first, in response to the detected information notification interval corresponding to the second graphic array, automatically switching the video source of the second graphic array from the first video source to the second video source, such that the second graphic array obtains and transmits signals from the second video source, continuously detecting the information notification interval corresponding to the signal transmitted by the first graphic array, and if the information notification interval corresponding to the signal transmitted by the first graphic array is detected, in response to the detected information notification interval corresponding to the first graphic array, automatically switching the video source of the first graphic array from the first video source to the second video source, such that the first graphic array obtains and transmits signals from the second video source, wherein the information notification interval comprises a vertical blanking interval.

6. The storage medium of claim 5 wherein the video source is switched from the first video source to the second video source in the vertical blanking interval.

* * * * *